Aug. 19, 1958 — J. H. MILLAR — 2,848,254
END FITTINGS FOR FLEXIBLE METALLIC HOSE
Filed Oct. 7, 1953 — 2 Sheets-Sheet 1

Inventor
John Humphrey Millar
By Lucke & Lucke
Attorney

Aug. 19, 1958  J. H. MILLAR  2,848,254
END FITTINGS FOR FLEXIBLE METALLIC HOSE
Filed Oct. 7, 1953  2 Sheets-Sheet 2
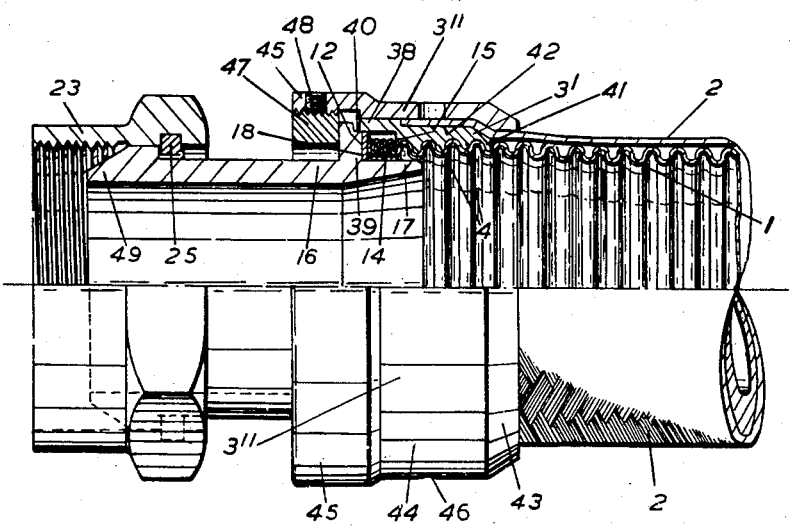
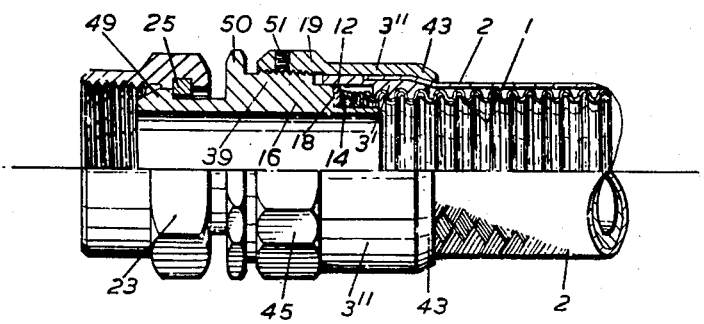
Inventor
John Humphrey Millar
By Locke & Locke
Attorney

United States Patent Office 2,848,254
Patented Aug. 19, 1958

2,848,254

END FITTINGS FOR FLEXIBLE METALLIC HOSE

John Humphrey Millar, Newport, R. I.

Application October 7, 1953, Serial No. 384,720

Claims priority, application Great Britain May 1, 1950

3 Claims. (Cl. 285—149)

The invention concerns improvements in or relating to end fittings, particularly coupling units, for flexible metallic hose of the corrugated or concertina-wall type and metallic hose furnished with such end fittings.

Flexible hose of the aforesaid type is frequently formed from metal strip rolled or otherwise formed to the appropriate profiled cross sectional form and then wound helically, the adjoining convolutions of the wound strip then being welded or otherwise secured together in a fluid-tight manner; in flexible hose made in this way the corrugations are helically arranged screw thread fashion and it is to hose of this kind that this invention especially relates although, in some of its forms, the invention may also be applied to hose of the "bellows" type, wherein the corrugations are purely annular and not helical.

It is also customary to provide flexible metallic hose externally with one or more layers of metal wire braiding to reinforce the hose and relieve it of tensile stresses, and this invention is also particularly concerned with flexible metallic hose reinforced in this manner.

An object of this invention is to provide an improved form of end fitting for a metallic hose of the type referred to. A further object of the invention is to provide an improved hose unit comprising a flexible metallic hose and at least one end fitting thereon, whilst a still further object of the invention is to provide for an improved anchorage of the ends of the tubular external reinforcement of the hose when such reinforcement is provided.

According to this invention there is provided an end fitting for a corrugated metallic hose having at least one surrounding tubular reinforcement, such end fitting comprising: an annular gripper sleeve coaxially and tight fittingly connected about an end of said hose, said gripper sleeve having an internally grooved part which receives a plurality of the external corrugations of the end portion of said hose lying therewithin, with the corrugations at the front extremity of said hose projecting forwardly beyond the grooved part of said sleeve, and also having an annular portion projecting forwardly from the said grooved part of the sleeve at such a position thereon that such annular portion surrounds the said corrugations at the front extremity of the hose, but is spaced outwardly therefrom; a tubular body mounted coaxially with said gripper sleeve and located forwardly thereof, the said tubular body fitting at its rear extremity closely within the said forwardly projecting annular portion of the gripper sleeve; a tubular spigot projecting rearwardly from the inner edge of said rear extremity of the tubular body and extending as a close fit into said end portion of said hose and within said gripper sleeve; an annular sealing washer coaxial with said gripper sleeve and trapped between said corrugations at the front extremity of the hose and said rear extremity of the said tubular body, the axial distance between the said rear extremity of the tubular body and the said gripper sleeve being such that at least some of the corrugations at the front extremity of the hose are axially crushed, said washer bearing against the said body and also bearing at its inner and outer peripheries respectively against the said spigot and annular portion of the gripper sleeve; a ferrule surrounding said gripper sleeve and trapping between co-operating clamping surfaces on itself and the latter said surrounding tubular reinforcement for the hose so that the front extremity of said reinforcement extends coaxially of the hose; and means for axially drawing together said tubular body and gripper sleeve to effect the said trapping of the said sealing washer.

In order that the invention may be more readily understood, certain embodiments of the same will now be described by way of example with reference to the accompanying drawings, in which:

Figure 4 is a view similar to Figure 1 but shows a further modified form of the end fitting; and Figure 5 is a view similar to Figure 1 but of yet another modified form of end fitting.

Figure 1:
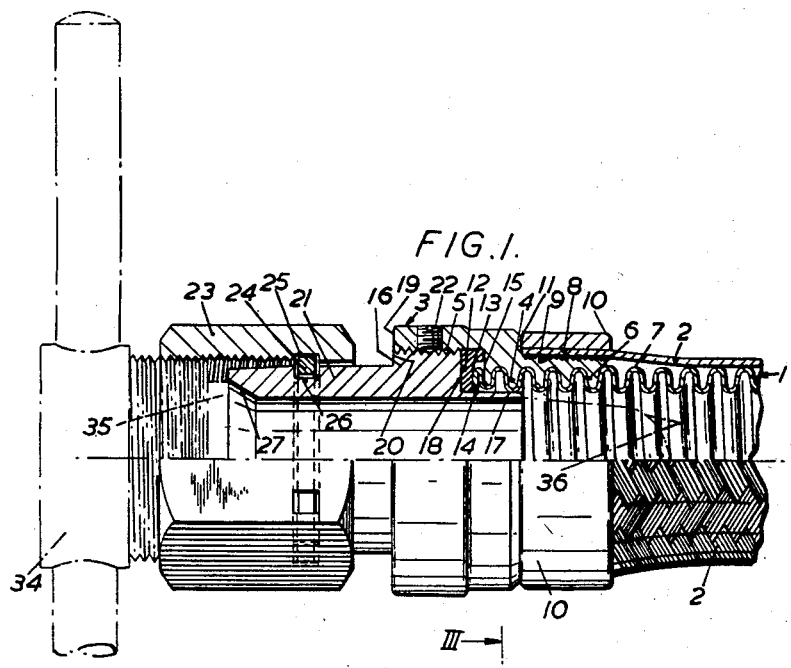
Figure 1 is a part side elevation and part longitudinal medial section of a part of a flexible metal hose and an end fitting according to this invention.

In Figure 1 is shown a part of a length of flexible metallic hose marked 1 having a corrugated wall, these corrugations being helically arranged around the hose and thus constituting a helical screw-thread. The hose is conveniently formed, as hereinbefore described, from a profiled strip of metal wound helically to constitute the wall of the hose and having the adjoining corrugations welded or otherwise secured together in a fluid-tight manner.

The hose 1 is furnished externally with a tubular metallic reinforcing layer 2 composed of braided metal wire and serving to resist expansion of the hose 1 under internal pressure and also serving to take tensile stresses applied to the hose.

The end fitting shown applied to the hose 1 in Figure 1 is in the form of a coupling unit for uniting the hose with another hose or component to which the hose is to be attached and this end fitting comprises a ferrule 3 of generally cylindrical form. The bore of the ferrule 3 is of two diameters, the rear part 4 of the bore being of considerably smaller diameter than the front part 5 of the bore.

The rear bore part 4 of the ferrule constitutes a gripper sleeve and is furnished with internal circumferentially extending corrugations in the form of a screw-thread 6 to receive and screw closely upon the exterior of the helical corrugations 7 of the wall of the flexible metallic hose 1. The threads of the screw-thread 6 are conveniently machined in the ferrule so that, although the latter can be screwed readily over the outer circumference of the metallic hose, the threads of the ferrule are a good fit upon the hose and are rounded at their apices and bases so as closely to conform to the approximately sinuous longitudinal cross-sectional shape of the wall of the hose.

In applying the coupling unit to the hose, the rear end of the ferrule is first screwed on to the exterior of the hose 1, the braided reinforcement 2 being slipped back from the end of the hose during this operation. Preferably the ferrule is screwed on to the hose until the front extremity of the hose enters the larger front bore part 5 of the ferrule; thus the screwing of the ferrule on to the hose may be continued until several, e. g. nine or ten, of the corrugations or convolutions of the hose have entered and protrude into the said front bore part 5 of the ferrule although in the drawings (for the sake of clarity) only one such corrugation or convolution is shown.

In the rear end of the front bore part 5 of the ferrule is placed a sealing ring 12 which bears upon the front extremity 14 of the hose 1 and which is arranged coaxially with the latter. This sealing ring may be formed of rubber or any other suitable material, such as synthetic material which is resistant or substantially resistant to the fluids that are to pass through the hose 1 and the end fitting thereon.

This sealing ring 12 may be provided with a peripheral substantially cylindrical flange 13 so as to be of shallow cup form, the body of the ring being adapted to be trapped, as hereinafter explained, against the front end 14 of the metallic hose 1 with the flange 13 of the sealing ring pressed against the annular surface or shoulder 15 formed in the ferrule 3 between the two bore parts 4 and 5 thereof.

Into the front end of the ferrule 3 is coaxially screwed a tubular body 16 furnished with an external screw-thread co-operating with a corresponding internal screw-thread provided in the front portion of the enlarged bore part 5 of the ferrule.

At its rear end the tubular body 16 is furnished with a coaxial tubular spigot 17 which, when the body 16 is screwed into the ferrule 3, projects into the interior of the hose 1 for a short distance so as internally to support the front end of the hose and thereby to assist in retaining the hose in the screw-thread 6 of the ferrule.

Externally the spigot 17 is of a considerably reduced diameter as compared with the rest of the tubular body 16 and the rear end 18 of this body constitutes an annular surface or shoulder which is adapted to bear on the front surface of the sealing ring 12 and, when the body 16 is screwed home into the ferrule 3, to compress the sealing ring tightly between itself and the front protruding end portion 14 of the hose 1 (the forwardly protruding corrugations or convolutions of which are crushed axially, either during this operation or previously, to form a firm flat support, square to the axis of the hose, against which the sealing ring 12 can bear), the flange 13 of the sealing ring 12 being simultaneously pressed tightly on to the annular surface or shoulder 15 of the ferrule 3. Thus a fluid-tight joint is made between the ferrule, the hose, the spigot 17 and the tubular body 16, this joint bridging the screw-threaded connection between the ferrule 3 and the body 16 and so sealing the hose against leakage via the said screw-threaded connection.

The tubular body 16 of the end fitting may be permanently secured in the ferrule 3 after having been screwed fully home into the latter by swaging the front end 19 of the ferrule inwardly over the external shoulder 20 of the tubular body formed by reducing the diameter of this body over the front part 21 thereof. However, when it is desired that the sealing ring 12 should be renewable, the ferrule may be secured against rotation, and consequently axial movement, relatively to the tubular body 16 by means of a grub screw 22 or any similar device passing radially through the ferrule and tightening on to the tubular body 16, as shown in Figure 1.

After applying the ferrule 3 to the hose end portion as above described, the front end portion 8 of the tubular reinforcement 2 of the hose is drawn over the rear end portion of the ferrule, this ferrule end portion preferably being cylindrically reduced in diameter as shown at 9. The end portion of the hose reinforcement 2 is clamped rigidly to the ferrule by means of a swage ring 10 previously threaded on to the exterior of the reinforcement and which is drawn on to the part 8 of the reinforcement after this has been laid over the rear end of the ferrule, the swage ring being swaged inwardly by any suitable known means so as firmly to grip the reinforcement end portion 8 between itself and the ferrule. Thus the tensile stresses applied to the flexible hose unit will be taken primarily by the reinforcement 2 and be transmitted to the ferrule 3. Moreover good electrical connection between the ferrule 3 and reinforcement 2 is achieved.

In order to improve the hold of the ferrule 3 on the reinforcement 2 and to prevent the latter creeping back under pressure from fluid inside the hose, the external surface of the reduced end 9 of the ferrule which fits within the reinforcement 2 may be peripherally roughened as by furnishing it with finely cut annular teeth, a fine screw-thread, serrations, knurling or any other suitable roughening. If desired the internal surface of the swage ring 10 may also be roughened.

The swage ring 10 preferably abuts at its front end against the external shoulder or step 11 formed between the front part of the ferrule 3 and the rear reduced part 9 of the ferrule.

In the large sizes of hoses and end fittings, e. g. those above 1½ inches internal diameter, the swage ring 10 may be carried forward over the front part of the ferrule 3 and beyond the front end 19 thereof not shown, this forward extension of the swage ring 10 being furnished with an internal screw-thread to receive a locking ring adapted to be arranged around the reduced front part 21 of the end fitting and screwing into the said screw-thread of the forward extension of the swage ring.

On the forwardly projecting reduced part 21 of the tubular body 16 is mounted, in the example illustrated, a union or swivel nut 23 which is rotatable relatively to the tubular body 16 and is conveniently interlocked with this body through the medium of a thrust wire 24 of rectangular cross sectional shape and engaging in circumferential grooves 25 and 26 provided respectively in the interior of the nut and the exterior of the tubular body 16.

The front end of the reduced part 21 of the tubular body 16 may be provided with an annular conical or part-spherical or other suitable seating 27 for co-operation with a nipple or the like of a co-operating coupling part or component to which the hose is to be attached, but it will be understood that the front part of the end fitting can be of any desired form according to the use to which it is to be put. For example, instead of being in the form shown in Figure 1 it could include a flange, an elbow or a T-piece or even a self-sealing coupling.

It will thus be seen that the end portion of the hose 1 is firmly mechanically secured to the end fitting without the necessity for the application of heat to the end fitting or the hose and thereby without the danger of detrimentally affecting the characteristics of the hose as a result of such heat. Moreover it will be appreciated that the mechanical connection between the hose and the end fitting is a robust one and that a good electrical connection is also effected between the hose and the end fitting. In addition it will readily be understood that where the hose is furnished with a tubular reinforcement, the latter is also very firmly secured to the end fitting and that a good electrical connection is made between the reinforcement and the end fitting.

Figure 2:
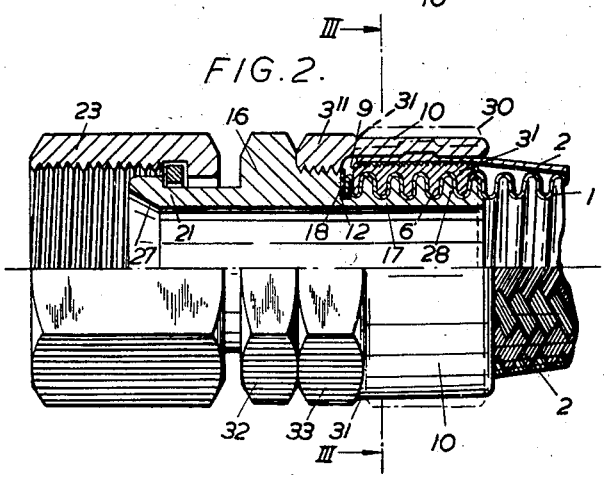
Figure 2 is a view similar to Figure 1 but shows a modified form of the end fitting.

In the modified embodiment of the invention illustrated in Figure 2 the end fitting is in many respects similar to that shown in Figure 1. Thus it includes a tubular body 16, the front reduced part 21 of which carries a union or swivel nut 23 and is furnished internally with an annular seating 27. In this case, however, the ferrule 3 previously described is modified and is made in two parts, an inner ferrule or gripper sleeve 3' and an outer ferrule 3"; the latter part having a swage ring 10 formed integrally therewith. Also the tubular body 16 is furnished with a spigot 17 which projects further into the hose 1 than the spigot 17 of the construction shown in Figure 1. Moreover the spigot 17 is externally screw-threaded so as to screw firmly but easily into the interior of the hose 1, the threads 28 of the spigot being, like the thread 6 of the ferrule 3, of the same pitch and amplitude as the corrugations in the hose and preferably having their apices and bases of rounded form so that the threads closely interengage with the hose.

The ferrule part or gripper sleeves 3' is likewise internally threaded to fit around the exterior of the hose 1 and its internal threads 6 are shaped and arranged similarly to the threads 28 of the spigot 17 but alternate with the latter.

Figure 3:
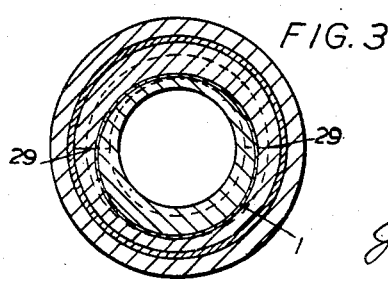
Figure 3 is a section on line III—III, Figure 2.

The inner ferrule 3' may be screwed on to the hose 1 from the front end thereof or it may be made in segments, e. g. in two halves mating diametrically as indicated in Figure 3 at 29, the ferrule in this case being conveniently applied radially to the hose instead of being screwed endwise on to the latter. It is advantageous to use a segmental ferrule part 3' where an end fitting is to be applied to a flexible metallic hose having a peripherally corrugated wall wherein the corrugations are all arranged bellows-fashion in planes at right angles to the axis of the hose and do not constitute a screw-thread on to which a ferrule can be screwed.

The tubular reinforcement 2 of the hose is adapted to be trapped at its front end between the exterior of the ferrule part 3' and the interior of the swage ring 10 in a similar manner to that described with reference to Figure 1, the ferrule part 3' conveniently having fine teeth or serrations 9 or other suitable roughening on its external surface to enhance its grip upon the reinforcement.

Initially the swage ring 10 occupies the dot and dash position shown at 30 in Figure 2 and is subsequently swaged inwardly to the full line position shown in this figure, the ferrule part 3" having a peripheral groove or weakening at 31 to facilitate the swaging operation.

The ferrule part 3" is screwed on to the tubular body 16 of the end fitting and this latter part and the ferrule may be respectively be provided with hexagon integral collars 32 and 33 to facilitate their relative rotation.

In addition the end fitting may, as show in Figure 2, include a sealing arrangement between the ferrule, the hose and the tubular body 16, such sealing arrangement being similar to that already described with reference to Figure 1 and comprising a sealing ring 12 trapped between the front end 14 of the hose 1 protruding from the front end of the ferrule part 3' and an annular surface or shoulder 18 on the tubular body 16.

Where the ferrule part 3' is of the split variety, it is preferably inwardly contracted on to the hose 1 by means of a swage ring 10 but this inward contraction of the ferrule part could be effected by providing it with a tapered or conical external surface co-operating with a similar internal annular surface provided on the ferrule part 3" so that, when the latter is screwed on to the body 16 of the end fitting, the said co-operating inclined surfaces will move relatively endwise and cause the ferrule part 3' to be contracted inwardly.

If the tubular body 16 and ferrule 3 are peripherally cylindrical as shown in Figure 1, for example, then a tool, such as indicated in dot and dash lines at 34 (Figure 1), may be provided to facilitate the screwing together of these parts of the end fitting, this tool being adapted to screw into the swivel nut 23 and having a shank 36 adapted to project through the bore of the tubular body 16 and into the bore of the hose 1, said shank being provided with a frusto-conical annular abutment surface 35 adapted to engage on the annular seat 27 of the tubular body 16 to secure the latter to the tool so that it can be rotated with the latter relatively to the ferrule while this is being held against rotation, e. g. in a vise.

In the modified embodiment illustrated in Figure 4 equivalent parts have been given the same reference numerals as in the previous figures, the hose 1 being of helically grooved form.

When the fitting is assembled, an inner ferrule or gripper sleeve 3' fits around the end portion of the hose 1, such gripper sleeve being provided with internal threading 4 mating with the screw-thread on the surface of the hose. This sleeve 3' is disposed so that its forward end face 15 is clear of the hose end leaving several corrugations extending forwardly beyond this end face; in Figure 4 approximately two such corrugations are shown, for the sake of clarity, although in practice a larger number, say 9 or 10, could and probably would be left. The gripper sleeve 3' is furnished with a forwardly projecting annular guide portion 38 adapted to engage the tubular body 16 which forms a second main component of the fitting.

This tubular body 16 has, towards its rear end portion, an annular enlargement or flange 39 which is stepped, as at 40, to provide a circumferential surface over which the sleeve guide portion 38 is adapted to slide. The tubular body 16 also has a spigot 17 projecting rearwardly therefrom so as to enter within the hose end and support the end corrugations of the hose. The end corrugations 14 of the hose are crushed axially to form a solid head on the end of the hose and this crushing may either be effected by the parts of the end fitting itself, when it is tightened-up, as referred to below, or can be carried out as a preliminary operation by a separate tool. A sealing washer 12 is disposed around the spigot 17 between the end face 18 of the tubular body 16 and the crushed corrugations 14 thereby to provide a gas- and liquid-tight seal at the joint between these two.

The outer surface of the gripper sleeve 3' is tapered inwardly at its rear end part 41, i. e. is of frustro-conical shape at this part, and has a reduced section 42 forwards of this part 41, for the accommodation of the end of the tubular metallic reinforcement is indicated in the drawing.

Disposed around the gripper sleeve 3', concentrically with the same and with the tubular body 16 is the third main component of the fitting, namely an outer ferrule 3". This latter has a rear end part 43 with a taper complementary to that of the gripper sleeve part 41, an intermediate cylindrical body section 44 fitting snugly on the gripper sleeve part 42 and thus co-operating with the latter to trap and anchor the front end of the reinforcing layer 2, and an enlarged head 45.

The cylindrical body section 44 of the outer ferrule is equipped with port and inspection holes indicated at 46, and the head 45 thereof is screw-threadedly engaged with a slotted locking ring 47 which, at its rear side, abuts against the front face of the flange 39 of the tubular body. Hence, when the outer ferrule 3" and ring 47 are screwed together the ferrule and body 16 are drawn towards one another. A locking pin or screw 48, e. g. a steel pin or a grub screw, is employed to lock the ring and ferrule together.

The end fitting can be arranged for coupling to an adjoining conduit or member in any of the conventional ways. Purely by way example, a nipple 49 is shown in the front end of the tubular body 16, this being connected to a female swivel coupling nut 23 by means of a thrust wire 25.

In assembling a fitting, as illustrated and described above, on to a hose, the outer ferrule 3" is first of all slidden over the end of the hose and the reinforcement, which has been cut square with the axis of the hose, until well clear of this end. The end portion of the reinforcement is then expanded and slid back to expose the hose 1 and the inner ferrule or gripper sleeve 3' is then screwed on to the hose underneath the braid for a distance sufficient to leave the required number of end corrugations 14 extending forwardly beyond the face 15. These corrugations are next crushed together by a plunger which is pressed into the sleeve portion 38 by suitable means, e. g. a hydraulic ram, while the gripper sleeve is positioned in a supporting fixture. The plunger is next removed and the sealing washer 12 is placed over the end of the spigot portion 17, this being inserted into the hose end. The reinforcing layer 2 is now slidden over the gripper sleeve 3' until it lies along the full length of the reduced section 42 thereof and the outer ferrule 3" is drawn forwardly over the reinforcing layer, the coupling being completed by tightening the locking ring 47.

As a result, the hose end corrugations 14 are axially crushed between the confronting surfaces 15 and 18 and the hose end clamped, the end 43 of the outer ferrule is pressed towards the co-operating surfaces 41 of the gripper sleeve to anchor the end of the reinforcing layer 2, and the completed fitting is thereby tightened-up. The extent to which the gripper sleeve 3' may move relatively to the body 16 during this tightening-up operation is limited by the abutment of the front end of the sleeve portion 38 against the step 40. The tubular body 16 may be provided with holes for the reception of wrench posts for operating during the tightening-up action.

The embodiment of the invention illustrated in Figure 5 is essentially similar to that shown in Figure 4 and the method of assembly is also similar. In this construction the head 45 of the outer ferrule has hexagon flats and is screwed directly on to an enlarged intermediate part of the tubular body 16, instead of on to a separate locking ring, and this body has an additional flat-provided collar 50 to enable it to be gripped.

If desired a locking pin or screw 51 may be provided to lock the body 16 to the outer ferrule 3". Preferably such a device is provided in one of the hexagon flats of the ferrule.

It is also to be noted that the parts of the end fitting may be made of any suitable material, for example, ferrous (e. g. mild or stainless steel) or non-ferrous (e. g. light alloys or brass) metals, according to the application envisaged.

Finally, it is to be noted that the illustrated embodiments are not exhaustive of the possible embodiments of the invention and variations of such embodiments. Thus, for instance, the hose may be of the bellows-type, in which event the gripper sleeve 3' illustrated in Figures 4 and 5 will be made in two or more segments adapted to be fitted around the end of the hose. In such a case the washer 12 is preferably of cup-like form to ensure adequate sealing of the split in the gripper sleeve.

It will be appreciated that an end fitting constructed as illustrated in Figures 4 and 5 is readily detachable from a flexible metal hose and can be re-used if in sound condition. Thus the fitting can be dis-assembled for replacing the hose or, if it is necessary, to replace any one of the parts of the fitting itself.

This application is a continuation-in-part of my application, Serial No. 223,906 filed May 1, 1951, now abandoned.

I claim:

1. An end fitting for a corrugated metallic hose having at least one surrounding tubular reinforcement, such end fitting comprising: an annular gripper sleeve coaxially and tight fittingly connected about an end of said hose, said gripper sleeve having an internally grooved part which receives a plurality of the external corrugations of the end portion of said hose lying therewithin, with the corrugations at the front extremity of said hose projecting forwardly beyond the grooved part of said sleeve, and also having an annular portion projecting forwardly from the said grooved part of the sleeve at such a position thereon that such annular portion surrounds the said corrugations at the front extremity of the hose, but is spaced outwardly therefrom; a tubular body mounted coaxially with said gripper sleeve and located forwardly thereof, the said tubular body fitting at its rear extremity closely within the said forwardly projecting annular portion of the gripper sleeve; a tubular spigot projecting rearwardly from the inner edge of said rear extremity of the tubular body and extending as a close fit into said end portion of said hose and within said gripper sleeve; an annular sealing washer coaxial with said gripper sleeve and trapped between said corrugations at the front extremity of the hose and said rear extremity of the said tubular body, the axial distance between the said rear extremity of the tubular body and the said gripper sleeve being such that at least some of the corrugations at the front extremity of the hose are axially crushed; said washer bearing against the said body and also bearing at its inner and outer peripheries respectively against the said spigot and annular portion of the gripper sleeve; a ferrule surrounding said gripper sleeve and trapping between co-operating clamping surfaces on itself and the latter said surrounding tubular reinforcement for the hose so that the front extremity of such reinforcement extends coaxially of the hose; and means for axially drawing together said tubular body and gripper sleeve to effect the said trapping of the said sealing washer.

2. An end fitting for a corrugated metallic hose having at least one surrounding tubular reinforcement, such end fitting comprising: an annular gripper sleeve coaxially and tight fittingly connected about an end of said hose, said gripper sleeve having an internally grooved part which receives a plurality of the external corrugations of the end portion of said hose lying therewithin, with the corrugations at the front extremity of said hose projecting forwardly beyond the grooved part of said sleeve, and also having an annular portion projecting forwardly from the said grooved part of the sleeve at such a position thereon that such annular portion surrounds the said corrugations at the front extremity of the hose, but is spaced outwardly therefrom; a tubular body mounted coaxially with said gripper sleeve and located forwardly thereof, the said tubular body fitting at its rear extremity closely within the said forwardly projecting annular portion of the gripper sleeve and having a screw-threaded connection with the latter at this location; a tubular spigot projecting rearwardly from the inner edge of said rear extremity of the tubular body and extending as a close fit into said end portion of said hose and within said gripper sleeve; an annular sealing washer coaxial with said gripper sleeve and trapped between said corrugations at the front extremity of the hose and said rear extremity of the said tubular body by screwing of the latter into the said annular portion of the gripper sleeve, some at least of the corrugations at the front extremity of the hose being axially crushed, said washer bearing against the said body and also bearing at its inner and outer peripheries respectively against the said spigot and annular portion of the gripper sleeve; and a ferrule surrounding said gripper sleeve and trapping between co-operating clamping surfaces on itself and the latter said surrounding tubular reinforcement for the hose so that the front extremity of such reinforcement extends coaxially of the hose.

3. An end fitting for a corrugated metallic hose having at least one surrounding tubular reinforcement, such end fitting comprising: an annular gripper sleeve coaxially and tight fittingly connected about an end of said hose, said gripper sleeve having an internally grooved part which receives a plurality of the external corrugations of the end portion of said hose lying therewithin, with the corrugations at the front extremity of said hose projecting forwardly beyond the grooved part of said sleeve, and also having an annular portion projecting forwardly from the said grooved part of the sleeve at such a position thereon that such annular portion surrounds the said corrugations at the front extremity of the hose, but is spaced outwardly therefrom; a tubular body mounted coaxially with said gripper sleeve and located forwardly thereof, the said tubular body fitting at its rear extremity closely within the said forwardly projecting annular portion of the gripper sleeve; a tubular spigot projecting rearwardly from the inner edge of said rear extremity of the tubular body and extending as a close fit into said end portion of said hose and within said gripper sleeve; an annular sealing washer coaxial with said gripper sleeve and trapped between said corrugations at the front extremity of the hose and said rear extremity of the said tubular body, the axial distance between the said rear extremity of the tubular body and the said gripper sleeve being such that at least some of the corrugations at the front extremity of the hose are axially crushed, said washer bearing against the said body and also bearing at its inner and outer peripheries respectively against the said spigot and annular portion of the gripper sleeve; a ferrule surrounding said gripper sleeve and trapping between co-operating clamping surfaces on itself and the latter said surrounding tubular reinforcement for the hose so that the front extremity of such reinforcement extends coaxially of the hose; and a forwardly projecting extension of said ferrule surrounding said tubular body, such ferrule extension being screw-threadedly engaged with said body so that relative rotation between the ferrule and body causes axial movement between the body and gripper sleeve to effect the said trapping of the said sealing washer.

References Cited in the file of this patent

UNITED STATES PATENTS

| | | | |
|---|---|---|---|
| 959,187 | Witzenmann | | May 24, 1910 |
| 1,329,760 | Fulton | | Feb. 3, 1920 |
| 1,588,606 | Oden | | June 15, 1926 |
| 1,699,591 | Jennings | | Jan. 22, 1929 |
| 1,793,887 | White | | Feb. 24, 1931 |
| 2,041,543 | Guarnaschelli | | May 19, 1936 |
| 2,309,719 | Vaill | | Feb. 2, 1943 |
| 2,357,669 | Lake | | Sept. 5, 1944 |
| 2,363,586 | Guarnaschelli | | Nov. 28, 1944 |

FOREIGN PATENTS

| | | | |
|---|---|---|---|
| 714,872 | France | | Nov. 21, 1931 |
| 460,336 | Great Britain | | Jan. 26, 1937 |
| 850,967 | France | | Dec. 30, 1939 |